US007796302B2

(12) United States Patent  
Asano et al.

(10) Patent No.: US 7,796,302 B2
(45) Date of Patent: Sep. 14, 2010

(54) IMAGE PROCESSING APPARATUS AND METHOD FOR GENERATING AN IMAGE SIGNAL FOR GRADATION

(75) Inventors: Kazuo Asano, Kanagawa (JP); Toru Misaizu, Kanagawa (JP); Takeshi Saito, Kanagawa (JP); Kouta Matsuo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 536 days.

(21) Appl. No.: 11/822,673

(22) Filed: Jul. 9, 2007

(65) Prior Publication Data

US 2008/0137962 A1 Jun. 12, 2008

(30) Foreign Application Priority Data

Dec. 6, 2006 (JP) .............................. 2006-329284

(51) Int. Cl.
*G06K 15/00* (2006.01)
(52) U.S. Cl. ..................... 358/3.06; 358/1.9; 358/3.13; 382/266
(58) Field of Classification Search ................ 358/3.13, 358/3.14, 3.15, 3.16, 3.17, 3.18, 3.19, 1.9, 358/3.06; 382/266, 269
See application file for complete search history.

(56) References Cited

U.S. PATENT DOCUMENTS

| | | | |
|---|---|---|---|
| 4,595,956 A * | 6/1986 | Kawamura et al. ......... 358/3.17 |
| 5,029,227 A | 7/1991 | Kawamura |
| 5,432,611 A | 7/1995 | Haneda et al. |
| 5,473,440 A | 12/1995 | Haneda et al. |
| 5,493,411 A | 2/1996 | Haneda et al. |
| 6,285,800 B1 * | 9/2001 | Yamazaki et al. ........... 382/266 |

FOREIGN PATENT DOCUMENTS

| | | |
|---|---|---|
| JP | A 62-050979 | 3/1987 |
| JP | A 05-167811 | 7/1993 |

* cited by examiner

*Primary Examiner*—Thomas D Lee
(74) *Attorney, Agent, or Firm*—Oliff & Berridge, PLC

(57) ABSTRACT

An image processing apparatus includes a receiving section, an edge detection section and a screen processing section. The receiving section receives image information. The edge detection section detects an edge area from the image information received by the receiving section. The screen processing section performs a screen process, which is based on area coverage modulation, for the image information on a basis of the detection result by the edge detection section. The screen processing section performs a screen process for the edge area detected by the edge detection section with (i) a screen angle, which is equal to that of a screen process performed for a non-edge area other than the edge area, and (ii) a number of lines per inch, which is an integer multiple of that of the screen process performed for the non-edge area.

8 Claims, 8 Drawing Sheets

⑤: Pixel in question

<Density Difference Determination>

$SH = |(① + ② + ③) - (⑦ + ⑧ + ⑨)|$
$SV = |(① + ④ + ⑦) - (③ + ⑥ + ⑨)|$
$SR = |(① + ② + ④) - (⑥ + ⑧ + ⑨)|$
$SL = |(④ + ⑦ + ⑧) - (② + ③ + ⑥)|$

Max(SH,SV,SR,SL) ≧ Edge threshold value → Edge area
Max(SH,SV,SR,SL) < Edge threshold value → Non-edge area

FIG. 4A

| 211 | 212 | 213 | 214 | 215 | 216 | 217 | 218 | 219 | 220 | 221 | 222 | 223 | 224 | 225 | 226 |
|---|---|---|---|---|---|---|---|---|---|---|---|---|---|---|---|
| 210 | 157 | 158 | 159 | 160 | 161 | 162 | 163 | 164 | 165 | 166 | 167 | 168 | 169 | 170 | 227 |
| 209 | 156 | 111 | 112 | 113 | 114 | 115 | 116 | 117 | 118 | 119 | 120 | 121 | 122 | 171 | 228 |
| 208 | 155 | 110 | 73 | 74 | 75 | 76 | 77 | 78 | 79 | 80 | 81 | 82 | 123 | 172 | 229 |
| 207 | 154 | 109 | 72 | 43 | 44 | 45 | 46 | 47 | 48 | 49 | 50 | 83 | 124 | 173 | 230 |
| 206 | 153 | 108 | 71 | 42 | 21 | 22 | 23 | 24 | 25 | 26 | 51 | 84 | 125 | 174 | 231 |
| 205 | 152 | 107 | 70 | 41 | 20 | 7 | 8 | 9 | 10 | 27 | 52 | 85 | 126 | 175 | 232 |
| 204 | 151 | 106 | 69 | 40 | 19 | 6 | 1 | 2 | 11 | 28 | 53 | 86 | 127 | 176 | 233 |
| 203 | 150 | 105 | 68 | 39 | 18 | 5 | 4 | 3 | 12 | 29 | 54 | 87 | 128 | 177 | 234 |
| 202 | 149 | 104 | 67 | 38 | 17 | 16 | 15 | 14 | 13 | 30 | 55 | 88 | 129 | 178 | 235 |
| 201 | 148 | 103 | 66 | 37 | 36 | 35 | 34 | 33 | 32 | 31 | 56 | 89 | 130 | 179 | 236 |
| 200 | 147 | 102 | 65 | 64 | 63 | 62 | 61 | 60 | 59 | 58 | 57 | 90 | 131 | 180 | 237 |
| 199 | 146 | 101 | 100 | 99 | 98 | 97 | 96 | 95 | 94 | 93 | 92 | 91 | 132 | 181 | 238 |
| 198 | 145 | 144 | 143 | 142 | 141 | 140 | 139 | 138 | 137 | 136 | 135 | 134 | 133 | 182 | 239 |
| 197 | 196 | 195 | 194 | 193 | 192 | 191 | 190 | 189 | 188 | 187 | 186 | 185 | 184 | 183 | 240 |
| 256 | 255 | 254 | 253 | 252 | 251 | 250 | 249 | 248 | 247 | 246 | 245 | 244 | 243 | 242 | 241 |

FIG. 4B

| 211 | 213 | 215 | 217 | 219 | 221 | 223 | 225 |
|---|---|---|---|---|---|---|---|
| 209 | 111 | 113 | 115 | 117 | 119 | 121 | 171 |
| 207 | 109 | 43 | 45 | 47 | 49 | 83 | 173 |
| 205 | 107 | 41 | 7 | 9 | 27 | 85 | 175 |
| 203 | 105 | 39 | 5 | 3 | 29 | 87 | 177 |
| 201 | 103 | 37 | 35 | 33 | 31 | 89 | 179 |
| 199 | 101 | 99 | 97 | 95 | 93 | 91 | 181 |
| 197 | 195 | 193 | 191 | 189 | 187 | 185 | 183 |

Density 31% | Density 0%
600dpi
Non-edge area | Edge area

Non-edge area | Edge area
300 lpi/90 degrees | 600 lpi/90 degrees

Non-edge area | Edge area
300 lpi/67 degrees | 600 lpi/90 degrees

IMAGE PROCESSING APPARATUS AND METHOD FOR GENERATING AN IMAGE SIGNAL FOR GRADATION

CROSS-REFERENCE TO RELATED APPLICATIONS

This application is based on and claims priority under 35 U.S.C. §119 from Japanese Patent Application No. 2006-329284 filed on Dec. 6, 2006.

BACKGROUND

1. Technical Field

The invention relates to an image processing apparatus and an image processing method for generating an image signal representing gradation using an area coverage modulation method.

2. Related Art

An image formation apparatus such as a copier or a printer using electrophotography, an ink jet system, etc., performs for input image information a screen process of artificially reproducing a halftone with binary values representing presence or absence of a drawing dot, and outputs the result by means of an output device.

A document generated by such an image formation apparatus includes various objects from the viewpoint of the image quality, such as an image of a photo, etc., graphics of gradation, patch, etc., and text, a line, etc., The number of lines per inch (how many identical patterns are contained per inch) is a representative parameter of the screen process. The optimum number of lines for the image object varies from one image object to another.

For example, preferably an image is generated with 200 lines per inch from the viewpoint of the human's eye characteristic. However, 170 to 230 lines per inch are often used because the gradation property and graininess are degraded due to the responsiveness of a marking engine if the number of lines per inch is high and because a screen structure is seen or texture is lost if the number of lines per inch is low.

For graphics, importance is further placed on the gradation property and graininess. Thus, 150 to 200 lines per inch are often used, and 300 lines or more per inch are often used for text and a line, which are desired to have no jaggy and no break.

That is, preferably the number of lines per inch is high as much as possible to smoothly represent text, a line, etc., but the gradation property and graininess are degraded if the number of lines per inch is too high.

Thus, the screen process is performed with a different number of lines per inch in response to each object. That is, plural threshold matrices different in the number of lines per line are stored and the screen process is performed with a different number of lines per inch in response to an object using the threshold matrices.

SUMMARY

According to an aspect of the invention, an image processing apparatus includes a receiving section, an edge detection section and a screen processing section. The receiving section receives image information. The edge detection section detects an edge area from the image information received by the receiving section. The screen processing section performs a screen process, which is based on area coverage modulation, for the image information on a basis of the detection result by the edge detection section. The screen processing section performs a screen process for the edge area detected by the edge detection section with (i) a screen angle, which is equal to that of a screen process performed for a non-edge area other than the edge area, and (ii) a number of lines per inch, which is an integer multiple of that of the screen process performed for the non-edge area.

BRIEF DESCRIPTION OF THE DRAWINGS

Exemplary embodiments of the invention will be described in detailed below with reference to the accompanying drawings, wherein:

FIG. 4 is a drawing to show an example of a threshold matrix used in a screen processing section;

DETAILED DESCRIPTION

Referring now to the accompanying drawings, exemplary embodiments of the invention will be described.

Figure 1:
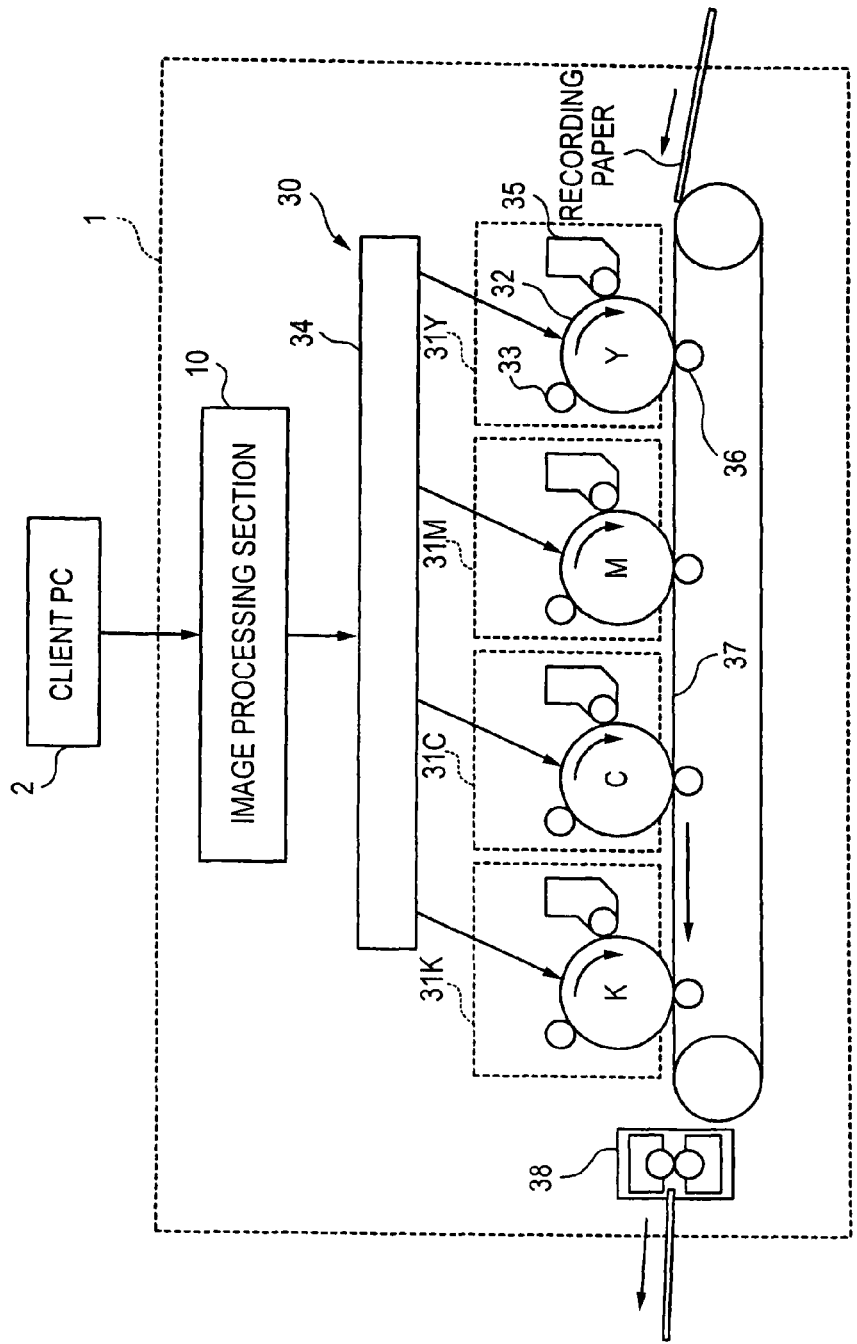
FIG. 1 is a drawing to show the general configuration of a printer system according to an exemplary embodiment of the invention.

FIG. 1 is a drawing to show the general configuration of a printer system according to an exemplary embodiment of the invention. Here, provided are an image formation apparatus 1 for expanding input information of an electronic document into an image and printing the image on a sheet of paper and a client PC (personal computer) 2 of a host computer for providing the electronic document for the image formation apparatus 1. Image data may be input to the image formation apparatus 1 from an image reader (not shown) other than the client PC 2.

The image formation apparatus 1 includes an image processing section 10 for performing predetermined image processing for the image data of the electronic document output from the client PC 2, for example, and a marking engine 30 serving as an image formation section. For example, the image formation section may be a tandem digital color printer using electrophotography.

The marking engine 30 includes plural image formation units 31Y, 31M, 31C, and 31K (hereinafter referred to as image formation unit 31 unless otherwise described for each color) placed in parallel with a given spacing in the horizontal direction and an exposure unit 34 for exposing a photoconductor drum 32 of each image formation unit 31 to light. That is, the image formation apparatus 1 forms a color image.

The image formation units 31Y, 31M, 31C, and 31K form Y (yellow), M (magenta), C (cyan), and K (black) toner images and transfer the toner images in sequence onto a sheet of recording paper serving as a recording medium.

The exposure unit 34, although not described in detail, is a multibeam exposure scan unit for collectively scanning plural laser beams emitted from a vertical cavity surface emission laser array chip having a light emission point group made up of plural light emission points and introducing the laser beams to the photoconductor drums 32 of the image formation units 31. Accordingly, it is made possible to form an image with a resolution of 2,400 dpi, for example.

Each of the four image formation units 31 includes the photoconductor drum 32, which is an image carrier (photoconductor), for forming an electrostatic latent image and holds a toner image, a charger 33 for uniformly charging the surface of the photoconductor drum 32, and a developing device 35 for developing the electrostatic latent image formed by the exposure unit 34. Each of the four image formation units 31 also includes a transfer roll 36 for transferring the toner image formed on the surface of the photoconductor drum 32 to a sheet of recording paper.

The marking engine 30 further includes a paper transport belt 37 for transporting the sheet of recording paper to a transfer position formed of the photoconductor drum 32 and the transfer roll 36 of each image formation unit 31. The marking engine 30 also includes a fixing device 38 for fixing the toner image transferred onto the sheet of paper.

Only the image processing section 10 rather than the whole of the image formation apparatus 1 may also be considered as the image processing apparatus.

Each of the four image formation units 31 includes almost similar components other than the color of toner stored in the developing device 35. The image data input from the client PC 2 is subjected to image processing by the image processing section 10 and is supplied to the marking engine 30 through a predetermined interface. The marking engine 30 operates based on a control signal of a synchronizing signal, etc., supplied from an image output control section (not shown). First, the yellow (Y) image formation unit 31Y forms an electrostatic latent image by the exposure unit 34 based on an image signal obtained from the image processing section 10 on the surface of the photoconductor drum 32 charged by the charger 33. The yellow (Y) image formation unit 31Y forms a yellow (Y) toner image by the developing device 35 for the electrostatic latent image and transfers the formed yellow (Y) toner image to record paper on the paper transfer belt 37 rotating in the arrow direction in the figure using the transfer roll 36. Likewise, M (magenta), C (cyan), and K (black) toner images are formed on the photoconductor drums 32 and are multiply transferred to the record paper on the paper transfer belt 37 using the transfer rolls 36. The multiply transferred toner image on the record paper is transported to the fixing device 38 and is fixed on the paper using heat and pressure.

The marking engine 30 of the image formation apparatus 1 shown in FIG. 1 adopts the configuration wherein the toner images are transferred onto the transported record paper in order. However, an image formation apparatus of a secondary transfer system adopting an intermediate transfer belt instead of the paper transfer belt 37 for multiply transferring toner images onto the intermediate transfer belt and then secondarily transferring the toner images onto record paper in batch can also be adopted.

Next, the image processing section 10 according to the exemplary embodiment will be described.

Figure 2:
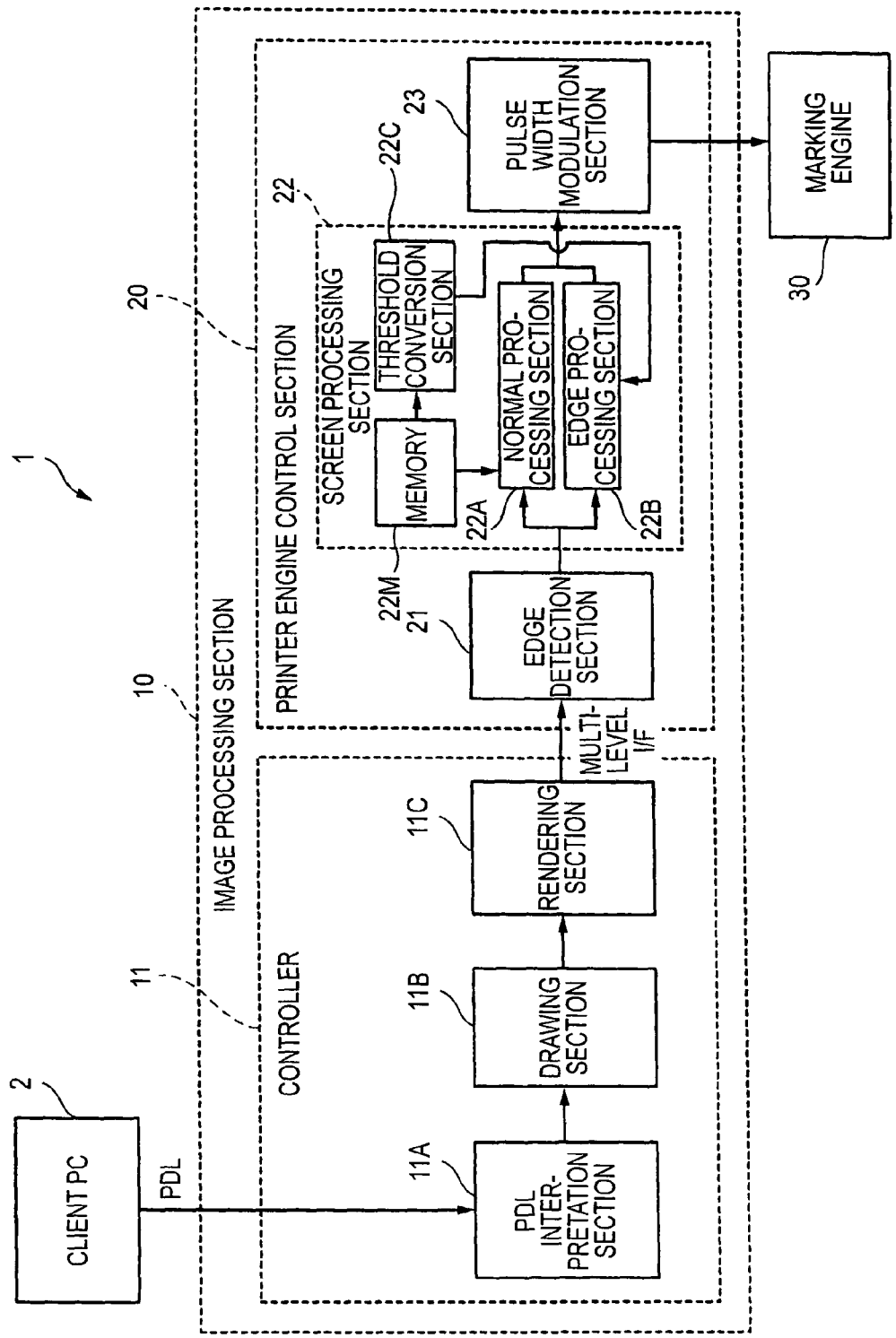
FIG. 2 is a block diagram to show the configuration of an image processing section.

FIG. 2 is a block diagram to show the configuration of the image processing section 10 according to the exemplary embodiment of the invention.

The image processing section 10 includes a controller 11, which may serve as a receiving section, and a printer engine control section 20.

The configuration example shows one which receives image data in a PDL (page description language) format from an external personal computer, etc., (client PC 2) and forms an image in the marking engine 30.

Respective functional processing sections will be described with reference to FIG. 2.

The controller 11 includes a PDL interpretation section 11A, a drawing section 11B, and a rendering section 11C.

The PDL interpretation section 11A interprets a command in the PDL (page description language) sent from the client PC 2.

The drawing section 11B converts a color signal (RGB) specified by the interpreted PDL into a color signal (YMCK) of the marking engine 30. The drawing section 11B converts the resolution of raster data of an image, etc., into engine resolution and converts image data of text/graphics into raster data having an engine resolution. To draw, an object tag of raster, text, or graphics is added for each pixel.

The rendering section 11C renders image data into image data fitted to a printer engine.

The printer engine control section 20 includes an edge detection section 21, a screen processing section 22, and a pulse width modulation section 23. The functional sections having the same configurations are provided in a one-to-one correspondence for the respective color signals (Y, M, C, and K).

The edge detection section 21 performs edge detection for each pixel by density difference determination using an edge detection window. The edge detection section 21 separates into an edge area and a non-edge area and adds edge determination tags, namely, an edge part tag to the edge area and a non-edge part tag to the non-edge area.

FIG. 3 is a schematic representation of an example of edge detection by the edge detection section 21.

Figures 3A, 3B:
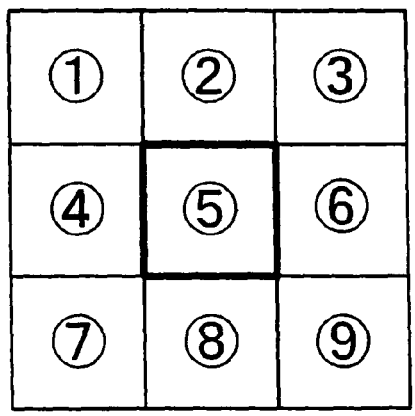
FIG. 3 is a schematic representation of an example of edge detection by an edge detection section.

That is, FIG. 3A shows a 3×3 pixel edge detection window. Densities of pairs of three pixels in surroundings of a pixel in question located at the center in FIG. 3A are compared with each other (in longitudinal, lateral, slanting directions) as shown in FIG. 3B to find differences SH, SV, SR, and SL (density difference determination). Then, these differences are compared with a predetermined edge threshold value. If any one of the differences is equal to or greater than the edge threshold value, the pixel in question is determined as an edge area; otherwise, the pixel in question is determined as a non-edge area.

The screen processing section 22 performs a screen process (binarization process) according to an area coverage modulation method. In the exemplary embodiment, gradation is represented by a halftone dot method.

FIG. 4 is a drawing to show an example of a unit cell of a threshold matrix (unit threshold matrix) used in the screen processing section 22.

The screen processing section 22 includes a normal processing section 22A for performing a screen process with a low number of lines per inch, and an edge processing section 22B for performing a screen process with a high number of lines per inch. The screen processing section 22 also includes a memory 22M, which may serve as a storage section for storing a threshold matrix used for the screen process, and a threshold conversion section 22C for converting the stored threshold matrix.

The memory 22M stores plural threshold matrices (non-edge area threshold matrices) to perform a screen process with (i) different numbers of lines per line and (ii) different screen angles, in response to objects. The non-edge area threshold matrix is set so as to perform a screen process with 300 lines per inch for text or a line, 200 lines per inch for an image, and 150 lines per inch for graphics, for example. In the exemplary embodiment, the non-edge area threshold matrix is stored in the memory 22M in a state of a screen matrix obtained by expanding a unit cell of a threshold matrix shown in FIG. 4A according to a cyclic matrix method, etc. The example shown in FIG. 4A is a 16×16 dot unit cell. The one unit cell forms one halftone dot, which grows in response to a density. If image information subjected to a screen process using the screen matrix obtained by expanding such a unit cell is drawn in 2400 dpi, the number of lines per inch becomes 150.

The threshold conversion section 22C generates a threshold matrix with a larger number of lines per inch (edge area threshold matrix) based on the non-edge area threshold matrix which correspond to each object and which is stored in the memory 22M. The edge area threshold matrix is set so as to have the number of lines per inch, which is an integer multiple of the non-edge area threshold matrix based on which the edge area threshold matrix is generated. Such an edge area threshold matrix can be created by thinning out threshold values at predetermined intervals from the non-edge area threshold matrix. For example, if the threshold values of the 16×16 dot unit cell shown in FIG. 4A are thinned out every other threshold value to form an 8×8 dot unit cell as shown in FIG. 4B, the number of lines per inch becomes 300, double in 2400 dpi.

The screen angle of the edge area threshold matrix is set equal to the screen angle of the non-edge area threshold matrix. It is assumed that the non-edge area threshold matrix is stored in the memory 22M as a screen matrix obtained by expanding a unit cell of a threshold matrix as in the exemplary embodiment. If the threshold values of the non-edge area threshold matrix are thinned out to generate the edge area threshold matrix, the non-edge area threshold matrix and the edge are threshold matrix become equal in the screen angle. If the non-edge area threshold matrix is stored in the memory 22M in a state of a unit cell and the unit cell is expanded subsequently to perform a screen process, expansion is executed so that the non-edge area threshold matrix and the edge are threshold matrix become equal in the screen angle.

Based on the edge determination tag added by the edge detection section 21, the screen processing section 22 performs a screen process in the normal processing section 22A for the non-edge area and performs a screen process in the edge processing section 22B for the edge area.

The normal processing section 22A performs the screen process with a different number of lines per line (and/or at a different angle) for each object. That is, the normal processing section 22A performs the screen process using the non-edge area threshold matrix corresponding to the object from among the non-edge area threshold matrices stored in the memory 22M based on the object tag added by the drawing section 11B of the controller 11.

The edge processing section 22B performs the screen process using the edge area threshold matrix, which is generated by the threshold conversion section 22C based on the non-edge area threshold matrix corresponding to the object. Accordingly, for the edge area, the screen process is performed with a higher number of lines per inch than the non-edge area, and jaggies in the edge area are made inconspicuous.

The number of lines per inch of the screen using the edge area threshold matrix is set to be an integer multiple of the number of lines per inch of the screen using the non-edge area threshold matrix as mentioned above. The edge area threshold matrix and the non-edge area threshold matrix are made equal to each other in the screen angle. Accordingly, periodical density change caused by screen interference in the screen boundary portion therebetween can be suppressed. If density change occurs, it can be made inconspicuous. The reason will be described below.

FIG. 5 is a drawing to describe the screen angle effect in the screen process for the edge area. FIG. 6 is a drawing to describe periodicity of a screen boundary portion.

Figure 5A:
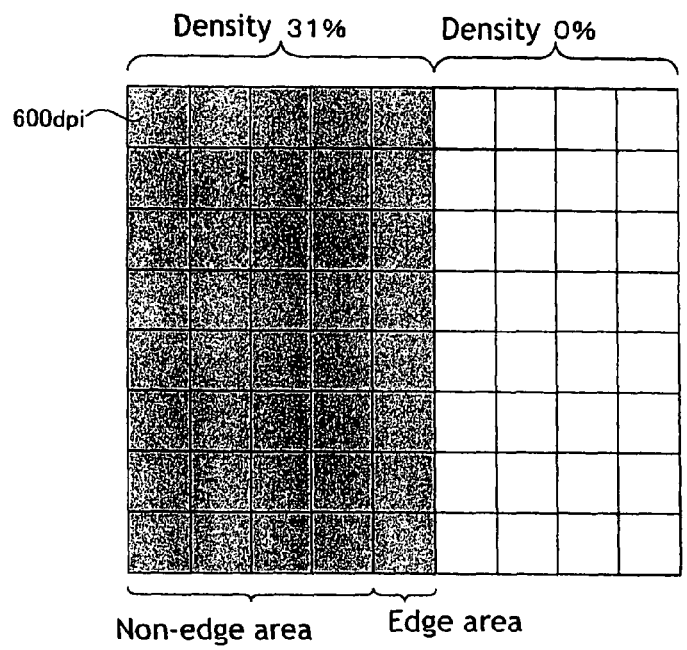
FIG. 5 is a drawing to describe the screen angle effect in a screen process.
Figure 5B:
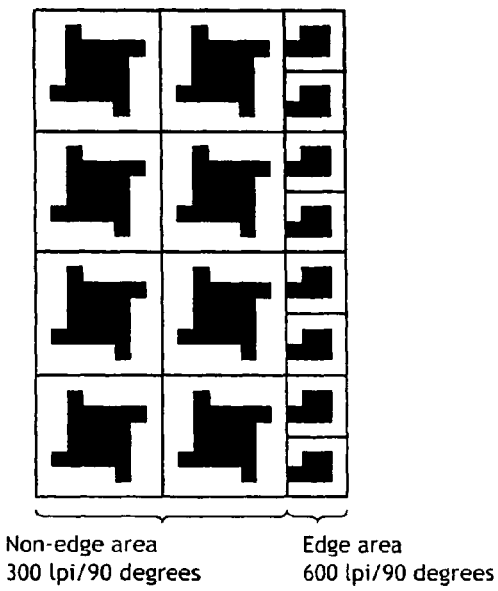
Figure 5C:
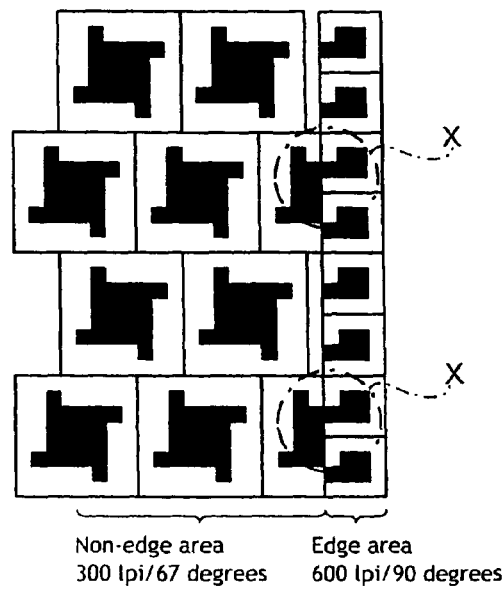
Figure 6:
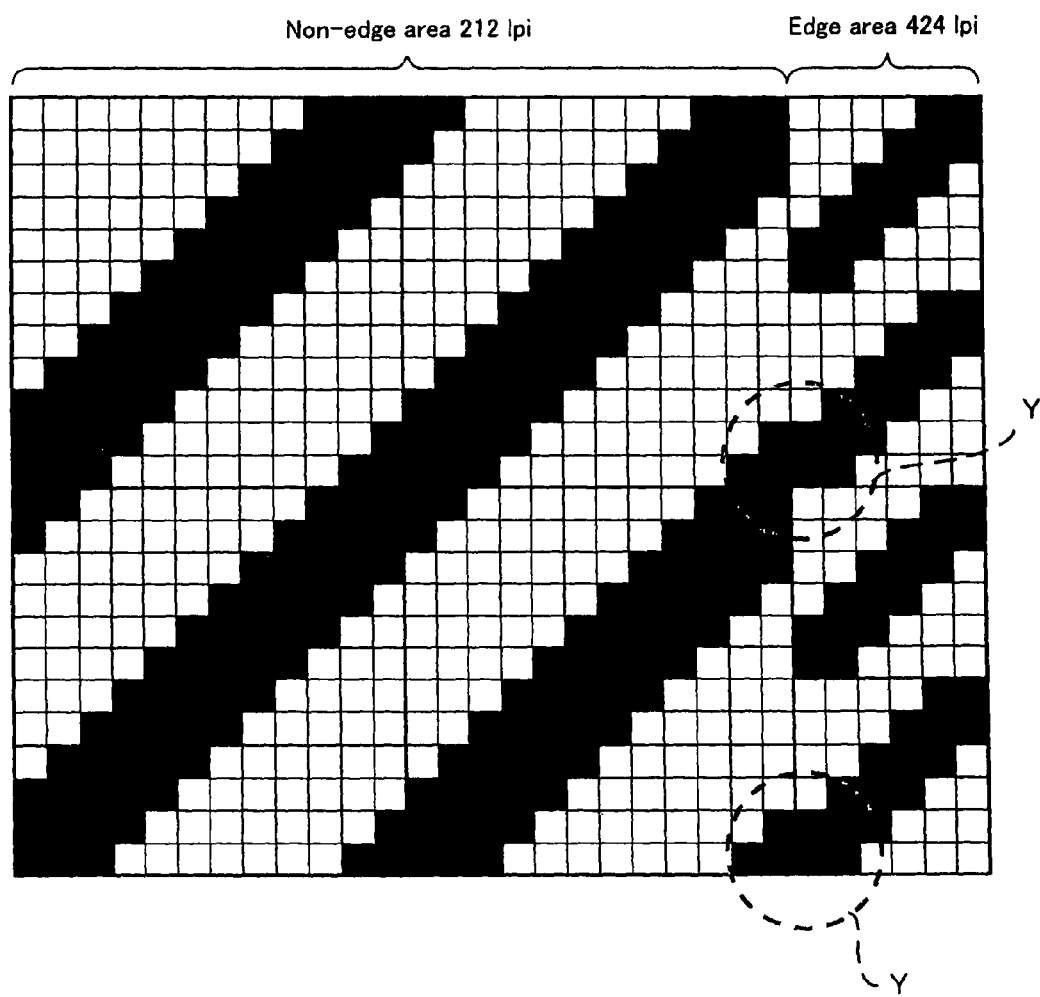
FIG. 6 is a drawing to describe periodicity of a screen boundary portion.

That is, FIG. 5A conceptually shows an edge portion of image information. An area indicated by halftone dots on the left of FIG. 5A is a drawing area at density 31% and the boundary portion with the blank (no dot) area on the right of FIG. 5A is an edge. The squares at density 31% forming the edge are an edge area. One cell in FIG. 5A is one dot at 600 dpi. FIGS. 5B and 5C show examples of drawing such image information at 2400 dpi using a screen having 300 lines per inch (one unit cell=8×8 dots) for the non-edge area and a screen having 600 lines per inch (one unit cell=4×4 dots) for the edge area. FIG. 5B shows an example wherein both the non-edge area and the edge area are set to have the same screen angle (90 degrees). FIG. 5C shows an example wherein the non-edge area and the edge area are set to have different screen angles, namely, the non-edge area is set to 67 degrees and the edge area is set to 90 degrees. As seen in FIGS. 5B and 5C, if the screen angles differ as shown in FIG. 5C, parts where the halftone dots of the non-edge area and the halftone dots of the edge area are continuous (are in contact with each other) appear periodically as indicated by X in FIG. 5C and is visually recognized as being lumpy and becomes unsightly. In contrast, if the screen angles are made equal to each other as in the example shown in FIG. 5B, the halftone dots drawing the non-edge area and the halftone dots drawing the edge portion are aligned completely (uniformly) in the positional relationship. Therefore, periodical density change does not occur in the screen boundary portion and an image defect can be prevented.

FIG. 6 shows an example wherein the screen process is performed for the non-edge area with 212 lines per inch and for the edge area with 424 lines per inch (twice 212 lines per inch). In this example, the halftone dots of the edge area are continuous to the halftone dots of the non-edge area every other line as indcted by Y in FIG. 6. That is, density periodicity occurs in the screen boundary portion. However, since the number of lines per inch of the edge area is an integer multiple of the number of lines per inch of the non-edge area (twice), the density period is not longer than the screen period of the non-edge area. Therefore, the defect is not conspicuous in visual recognition. That is, an image defect can be suppressed.

The pulse width modulation section 23 performs pulse width modulation for the image data subjected to the screen process by the screen processing section 22, and supplies an image signal to the marking engine 30.

Next, the whole operation of the image processing section 10 will be described.

Figure 7:
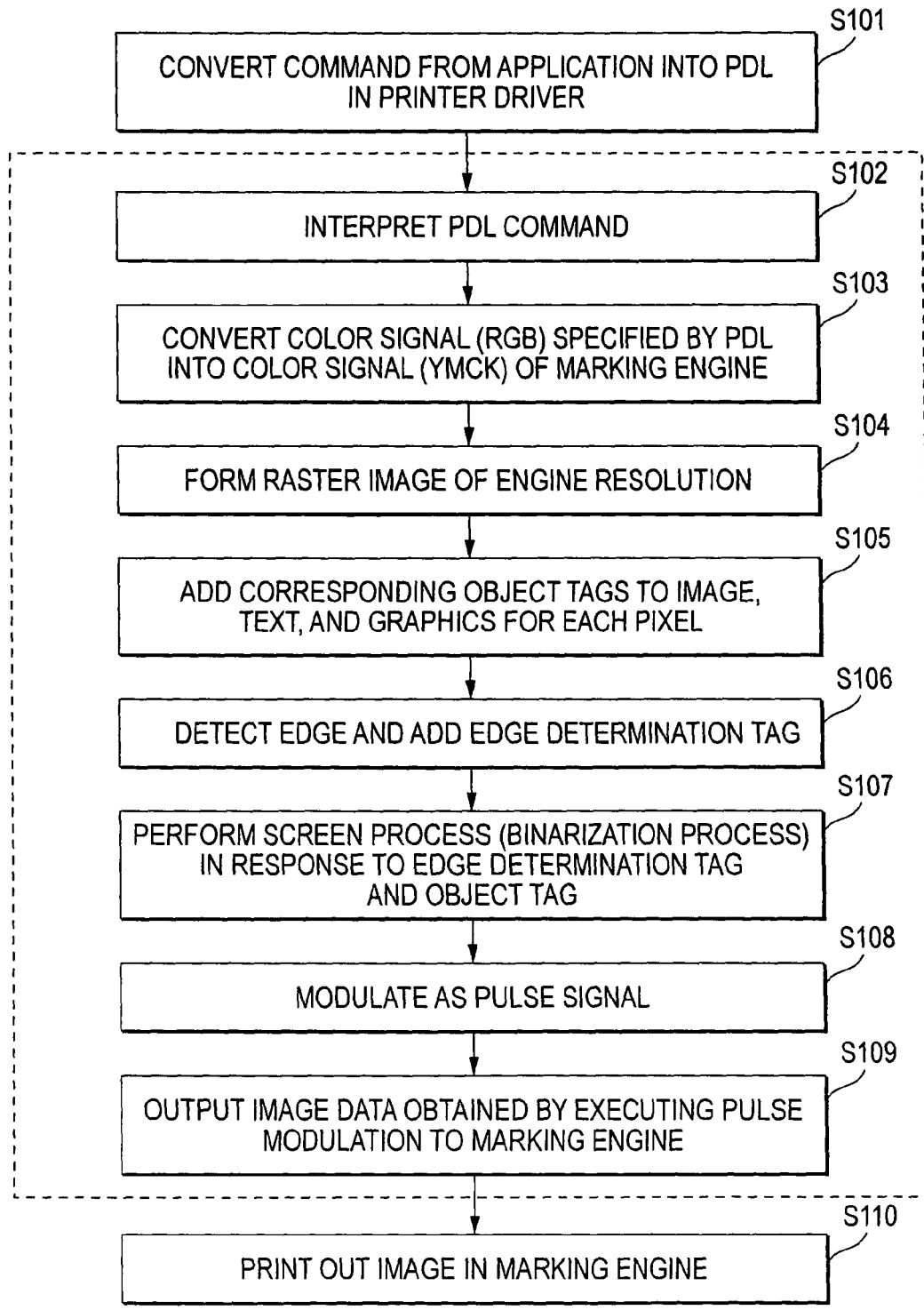
FIG. 7 is a flowchart to show a flow of image processing.

FIG. 7 is a flowchart to show a flow of image processing executed by the client PC 2, the image processing section 10, and the marking engine 30. Steps 102 to 109 are processes executed by the image processing section 10. The reference numerals of the functional processing sections are shown in FIG. 2.

First, the printer driver of the client PC 2 converts a command from application software into a PDL (printer description language) of a drawing command of a printer (step 101).

The drawing command of the PDL is sent from the client PC 2 to the image formation apparatus 1. In the image processing section 10 of the image formation apparatus 1, the PDL interpretation section 11A interprets the acquired PDL command (step 102).

Then, the drawing section 11B converts the color signal (RGB) specified by the interpreted PDL into a color signal (YMCK) of the marking engine 30 (step 103). After the color conversion, the drawing section 11B and the rendering section 11C form a raster image of engine resolution (step 104). In drawing by the drawing section 11B, corresponding object tags are added to image, text, and graphics (step 105). The image data is sent to the printer engine control section 20 through an eight-bit multilevel interface (I/F), for example.

In the printer engine control section 20, the edge detection section 21 detects an edge for each pixel and adds edge determination tags, that is, an edge part tag to the edge area and a non-edge part tag to the non-edge area (step 106).

Then, the screen processing section 22 executes a screen process for the edge area and the non-edge area with different numbers of lines per inch using the threshold matrix (step 107).

That is, according to the edge determination tags added by the edge detection section 21, the normal processing section 22A performs a screen process for the non-edge area and the edge processing section 22B performs a screen process with a higher number of lines per inch for the edge area. This topic is described later in detail.

Then, the image data for each object of the non-edge area and the image data of the edge area separately subjected to the screen process are merged and the resultant image data is input to the pulse width modulation section 23, which then modulates the image data subjected to the screen process by the screen processing section 22 into a pulse signal (step 108).

The image data obtained by executing the pulse modulation is output to the marking engine 30 (step 109).

When the marking engine 30 acquires the image data, it forms a color image on record paper and prints out the image by the components as shown in FIG. 1 (step S110).

Figure 8:
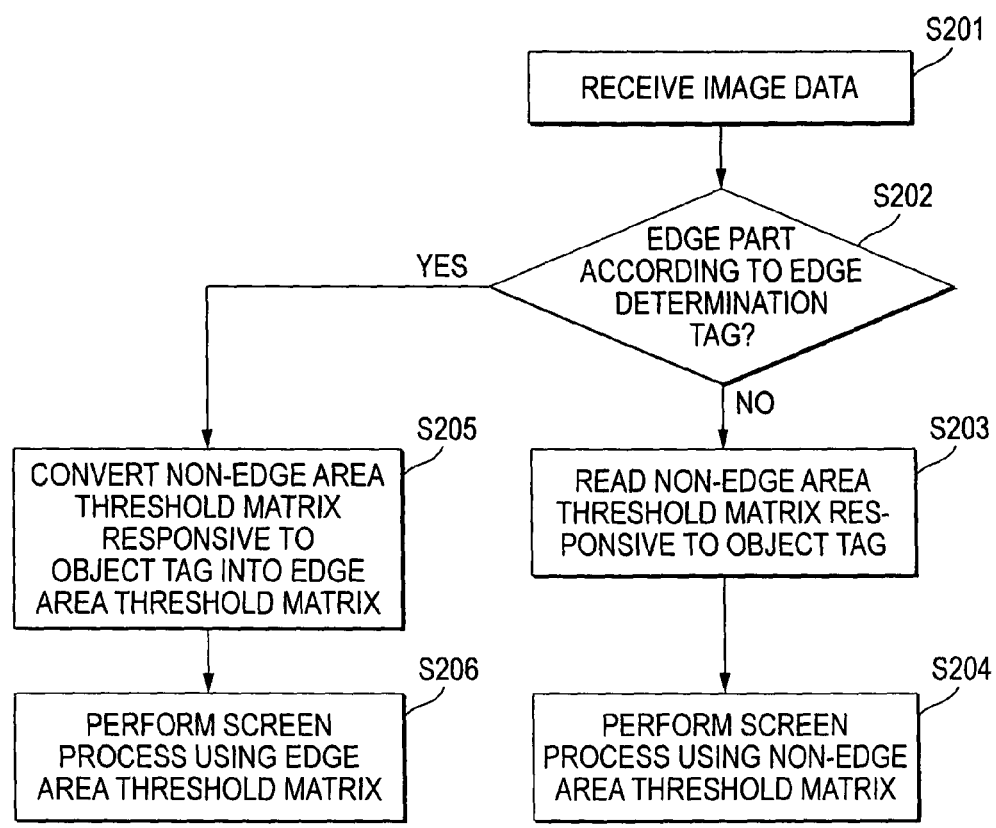
FIG. 8 is an operation flow of the screen processing section.

FIG. 8 is an operation flow of the screen processing section 22.

After receiving image data (step 201), the screen processing section 22 classifies the image data (pixels) into an edge area and a non-edge area based on the edge determination tags for the respective pixels (step 202).

For the non-edge area, the normal processing section 22A reads the corresponding non-edge area threshold matrix from the memory 22M based on the object tag (step 203) and performs the screen process with a different number of lines per line (and/or at a different angle) for each object (step 204).

On the other hand, for the edge area, the corresponding non-edge area threshold matrix is read from the memory 22M based on the object tag, and is converted into an edge area threshold matrix by the threshold conversion section 22C (step 205). Using the edge area threshold matrix, the screen process is performed with a different higher number of lines per line (and/or at a different angle) for each object (step 206).

It is to be understood that the invention is not limited to the specific embodiment thereof and various modifications and changes can be made appropriately.

For example, the exemplary embodiment described above is an example of applying the invention to the color image formation apparatus, but the invention may be applied to a monochrome image formation apparatus.

What is claimed is:

1. An image processing apparatus comprising:
a receiving section that receives image information;
an edge detection section that detects an edge area from the image information received by the receiving section for each pixel by density difference determination, separates the image information into the edge area and a non-edge area, and adds edge determination tags to at least one of the edge area and the non-edge area; and
a screen processing section that performs a screen process, which is based on area coverage modulation, for the image information on a basis of the detection result by the edge detection section, wherein:
the screen processing section performs a screen process for the edge area detected by the edge detection section with (i) a screen angle, which is equal to that of a screen process performed for the non-edge area other than the edge area, and (ii) a number of lines per inch, which is an integer multiple of that of the screen process performed for the non-edge area.

2. The apparatus according to claim 1, wherein the screen processing section comprises:
a storage section that stores a non-edge area threshold matrix for use in the screen process for the non-edge area; and
a matrix conversion section that generates, based on the non-edge area threshold matrix, an edge area threshold matrix for use in the screen process for the edge area.

3. An image processing apparatus comprising:
a receiving section that receives image information;
an edge detection section that detects an edge area of the image information received by the receiving section for each pixel by density difference determination, separates the image information into the edge area and a non-edge area, and adds edge determination tags to at least one of the edge area and the non-edge area; and
a screen processing section that performs a screen process, which is based on area coverage modulation, for the image information on a basis of the detection result by the edge detection section, wherein:
the screen processing section comprises:
a storage section that stores a non-edge area threshold matrix for use in a screen process for the non-edge area other than the edge area detected by the edge detection section; and
a matrix conversion section that generates, based on the non-edge area threshold matrix, an edge area threshold matrix for use in a screen process for the edge area.

4. The apparatus according to claim 3, wherein the screen processing section uses the edge area threshold matrix to perform the screen process for the edge area with (i) a screen angle, which is equal to that of the screen process performed for the non-edge area using the non-edge area threshold matrix, and (ii) a number of lines per inch, which is an integer multiple of that of the screen process for the non-edge area.

5. The apparatus according to claim 4, wherein the matrix conversion section thins out threshold values at predetermined intervals from the non-edge area threshold matrix to generate the edge area threshold matrix.

6. An image processing method comprising:
receiving image information;
detecting an edge area from the received image information for each pixel by density difference determination;
separating the image information into the edge area and a non-edge area;
adding edge determination tags to at least one of the edge area and the non-edge area; and
performing a screen process, which is based on area coverage modulation, for the image information on a basis of the detection result, wherein:
the performing comprises performing a screen process for the detected edge area with (i) a screen angle, which is equal to that of a screen process performed for the non-edge area other than the edge area, and (ii) a number of lines per inch, which is an integer multiple of that of the screen process performed for the non-edge area,
wherein at least one of the steps is executed using a processor.

7. An image processing method comprising:
receiving image information;
detecting an edge area of the received image information for each pixel by density difference determination;
separating the image information into the edge area and a non-edge area;
adding edge determination tags to at least one of the edge area and the non-edge area;
performing a screen process for the non-edge area other than the edge area, using a predetermined non-edge area threshold matrix;
generating, based on the non-edge area threshold matrix, an edge area threshold matrix; and
performing a screen process for the edge area using the generated edge area threshold matrix,
wherein at least one of the steps is executed using a processor.

8. The method according to claim 7, wherein the screen process performed for the edge area using the edge area threshold matrix is performed with (i) a screen angle, which is equal to that of the screen process performed for the non-edge area using the non-edge area threshold matrix, and (ii) a number of lines per inch, which is an integer multiple of that of the screen process performed for the non-edge area.

* * * * *